United States Patent [19]
Yamada et al.

[11] Patent Number: 5,504,848
[45] Date of Patent: Apr. 2, 1996

[54] WORD PROCESSOR WITH DATA TABLE CALCULATING FUNCTION, CAPABLE OF INDICATING NECESSITY OF RE-CALCULATIONS TO SOLVE MATHEMATICAL EXPRESSIONS IN CHANGED DATA TABLE

[75] Inventors: Manami Yamada, Seto; Satoko Kuze, Nagoya, both of Japan

[73] Assignee: Brother Kogyo Kabushiki Kaisha, Aichi, Japan

[21] Appl. No.: 161,799

[22] Filed: Dec. 6, 1993

[30] Foreign Application Priority Data

Dec. 22, 1992 [JP] Japan ................... 4-356889

[51] Int. Cl.$^6$ ........................................ G06F 17/11
[52] U.S. Cl. .................. 395/148; 395/146; 395/155; 395/161
[58] Field of Search ................... 395/144–149, 395/155, 161, 157, 600, 924; 364/419.1, 419.14

[56] References Cited

U.S. PATENT DOCUMENTS

| | | | |
|---|---|---|---|
| 5,189,608 | 2/1993 | Lyons et al. | 364/408 |
| 5,280,575 | 1/1994 | Young et al. | 395/148 |

*Primary Examiner*—Almis R. Jankus
*Attorney, Agent, or Firm*—Oliff & Berridge

[57] ABSTRACT

A text processor is capable of creating table data based on numerical values and mathematical expressions entered through a keyboard, and displaying the data on a display screen. The text processor avoids unnecessary re-calculation of table data by a) allowing a user of the text processor to selectively inhibit automatic recalculation of mathematical expressions, b) recalculating only mathematical expressions whose operands and/or mathematical operators have been changed, and c) providing indication to the user as to which mathematical expressions have been changed and require recalculation.

14 Claims, 13 Drawing Sheets

FIG. 8

| | A | B | C | D | |
|---|---|---|---|---|---|
| | | | IE↓ A2: | DE↓ | DE↓ |

A2 :

| | A | B | C | D |
|---|---|---|---|---|
| 1 | Abc | Deh | Ikm | Nos |
| 2 | 10 | | | |
| 3 | | | | |
| 4 | BK | | | |
| 5 | | | | |
| 6 | | | | |
| 7 | | | | |
| 8 | | | | |
| 9 | | | | |

FIG. 9

| | A | B | C | D | |
|---|---|---|---|---|---|
| 1 | Abc | Deh | Ikm | Nos | |
| 2 | 10 | 20 | 30 | 60 | |
| 3 | | | | | |
| 4 | | | | | |
| 5 | | | | | |
| 6 | | | | | |
| 7 | | | | | |
| 8 | | | | | |
| 9 | | | | | |

| | A | B | C | D |
|---|---|---|---|---|
| B3 : | | | | |
| 1 | Abc | Deh | Ikm | Nos |
| 2 | 10 | 20 | 30 | 60 |
| 3 | 25 | 15 | 35 | 75 |
| 4 | 35 | 35 | 65 | 135 |
| 5 | | | | |
| 6 | | | | |
| 7 | | | | |
| 8 | | | | |
| 9 | | | | |

FIG.11

| | A | B | C | D | |
|---|---|---|---|---|---|
| B3 : | | | | | |
| 1 | Abc | Deh | Ikm | Nos | |
| 2 | 10 | 20 | 30 | 60 | |
| 3 | 25 | 25 | 35 | 75 | |
| 4 | 35 | 35 | 65 | 135 | |
| 5 | | BK | | | |
| 6 | | | | | |
| 7 | | | | | |
| 8 | | | | | |
| 9 | | | | | |

FIG. 12

| | A | B | C | D |
|---|---|---|---|---|
| B3 : | | | | |
| 1 | Abc | Deh | Ikm | Nos |
| 2 | 10 | 20 | 30 | 60 |
| 3 | | 25 | | |
| 4 | | 35 | | |

"Some operation has wrong result !! Re-calculate ?"

(CANCEL)  (EXECUTE)

FIG. 13

| | A | B | C | D | |
|---|---|---|---|---|---|
| 1 | Abc | Deh | Ikm | Nos | |
| 2 | 10 | 20 | 30 | 60 | |
| 3 | 25 | 25 | 35 | 85 | |
| 4 | 35 | 45 | 65 | 135 | |
| 5 | | | | | |
| 6 | | | | | |
| 7 | | | | | |
| 8 | | | | | |
| 9 | | | | | |

A1 :

WORD PROCESSOR WITH DATA TABLE CALCULATING FUNCTION, CAPABLE OF INDICATING NECESSITY OF RE-CALCULATIONS TO SOLVE MATHEMATICAL EXPRESSIONS IN CHANGED DATA TABLE

BACKGROUND OF THE INVENTION

1. Field of the Invention

The present invention relates in general to a word processor or a text processing apparatus or system capable of performing calculating operations associated with numerical values included in a table of data according to mathematical expressions also included in the table. More particularly, the present invention is concerned with techniques relating to re-calculating operations to solve the mathematical expressions upon changing of an existing data table before storing or printing the changed data table.

2. Discussion of the Related Art

Word processors adapted to deal with Japanese-Chinese characters or alphabetic or European language characters are known and used. These word processors have various functions such as: a basic text input function; a function of moving or copying a desired portion of a text; a function of storing selected words or phrases for subsequent use; a function of modifying characters; a function of creating a table of data or spread sheet; and other functions necessary to create and edit a text.

Such word processors of modern vintage have an optional function of performing calculating operations to solve mathematical expressions included in a data table. For example, this calculating function (referred to as "spread-sheet calculating function" where appropriate) finds application in the preparation or creation of a pay roll (pay sheet), a list of students' records and an estimate sheet. Usually, a table of data or spread sheet has data areas (also called "fields" or "cells") which are defined by a plurality of parallel rows and a plurality of parallel columns perpendicular to the rows. In these data areas, there are accommodated or placed respective items of the table, which include numerical values and mathematical expressions (mostly, algebraic formulas) entered by the operator of the word processor. The word processor automatically performs calculating operations to solve the mathematical expressions. For instance, mathematical expressions in the form of algebraic formulas for summing the numerical values in each row and/or the numerical values in each column are included in the last row and/or the last column of the table. The data table is displayed, with the results of the calculating operations being placed in the appropriate data areas. See a table in FIG. 10 in which results of summing operations are placed in Row 4 and Column D.

In a spread-sheet calculation mode in which the calculating operations to solve mathematical expressions are performed as described above, the word processor deals with the numerical values and mathematical expressions as data different from ordinary text data. That is, data processed in the spread-sheet calculation mode conform with a spread-sheet calculation format, while text data processed in a text creation mode conform with a text creation format.

An example of a table of data (table of items) is illustrated below.

|   | A      | B               | C      | D                       |
|---|--------|-----------------|--------|-------------------------|
| 1 | 10     | 16 × 4.25       | 32     | A1 + B1 + C1            |
| 2 | 35     | $1.55 \times 10^2$ | 25     | A2 + B2 + C2            |
| 3 | A1 + A2 | B1 + B2         | C1 + C2 | A1 + A2 + B1 + B2 + C1 + C2 |

In the above example, the twelve data areas are defined by three rows and four columns, and are identified by respective combinations of a row address (1, 2 or 3) and a column address (A, B, C or D). Purely numerical values are placed in the data areas A1, A2, C1 and C2, while mathematical expressions are placed in the data areas A3, B1, B2, B3, C3, D1, D2 and D3. Generally, each mathematical expression consists of a plurality of operands, and at least one operator. The operators are represented by operation symbols such as "+", "−", "×", and "÷" for addition, subtraction, multiplication and divisions, respectively. An operand in a mathematical expression is either a numerical value as in the mathematical formulas in the data areas B1 and B2, or is specified by an address code which consists of the row and column addresses of one of the data areas of the table, as in the algebraic formulas in the data areas A3, B3, C3 and D1–D3. Such address code represents the numerical value placed in the data area specified. In the above table, the address code A1 in the algebraic formula in the data area A3 represents the numerical value "10" in the data area A1, for example. Thus, the mathematical expression is either a mathematical formula which consists of numerical values and at least one operator, or an algebraic formula which consists of address codes and at least one operator.

In some of the known word processors having the table or spread-sheet calculating function as described above, calculating operations are performed in a selected automatic or manual mode, when a new data table is created or when an existing data table is changed. In the automatic mode, re-calculating operations are automatically performed for all the mathematical expressions included in the existing table, each time a numerical value or mathematical expression is entered during a data entry operation to change or update the existing table. The re-calculation takes place for all the mathematical expressions (mathematical formulas and algebraic formulas), regardless of whether the newly entered numerical value is the same as or different from the corresponding original or existing value. Further, all the mathematical expressions are solved again even if the changed numerical value relates to only some limited algebraic formulas. For instance, if the numerical value "10" in the data area A1 in the above exemplary table is changed to "12" for example, re-calculating operations are effected to solve all the algebraic formulas in the data areas A3, B3, C3 and D1–D3. In fact, the re-calculation is necessary for only the formulas in the data areas A3, D1 and D3. If the algebraic formula "C1+C2" in the data area C3 is changed to "C1−C2", for example, all the formulas including the unchanged formulas are solved, though the re-calculation is necessary for only the changed formula "C1−C2".

In the manual mode, on the other hand, re-calculating operations are automatically effected only when any mathematical expression (algebraic formula) including address codes is entered during an operation to change the existing data table. In the manual mode, however, re-calculating operations to solve the unchanged algebraic formulas will not be performed, even when a numerical value used as an operand in some of the unchanged algebraic formulas is changed. To solve the unchanged algebraic formulas associated with the changed numerical value, the operator should use an appropriate function key and cursor keys. If the original value "10" in the data area A1 in the above exemplary table is changed to "12", for example, the operator should use the cursor keys to designate the data area A3 accommodating the algebraic formula "A1+A2", after the operation of the appropriate function key, to effect re-calculation for solving the formula "A1+A2". Similarly, the data areas D1 and D3 should be designated by the cursor keys to solve the formulas "A1+B1+C1" and "A1+A2+B1+B2+C1+C2".

Thus, the known word processors suffer from an unnecessary calculating time in the automatic mode, since the automatic re-calculation takes place for all the algebraic formulas each time a numerical value or mathematic expression of the existing table is entered during an operation to change or update the existing table. Thus, the unchanged algebraic formulas are re-calculated unnecessarily even when the re-entered numerical value or mathematical expression is the same as the original or existing value or expression, or even when the changed numerical value or mathematical expression is used in only selected ones of the algebraic formulas, or even when the data table does not include any algebraic formulas. Accordingly, the operator should wait a considerable time after entry of each numerical value or or mathematical expression during data entry to update the existing table. The re-calculating operation requires an interruption of the operator's operation to update the existing table. If the table includes relatively large numbers of mathematical expressions and numerical values, the interruption time due to the re-calculation to solve all the mathematical expressions tends to be long, whereby the operator is unable to concentrate on the operation to update the existing table. Consequently, the text creating efficiency tends to be low.

In the manual mode, too, the re-calculating operations are performed for all the mathematical expressions if any mathematical expression is entered during an operation to change the existing data table. Thus, all the formulas are solved even if the newly entered mathematical expression is the same as the corresponding original expression. In this respect, the re-calculation is effected unnecessarily. Further, since the re-calculation to solve the algebraic formulas is not automatically effected even when a numerical value is changed from the original value in the existing table, there is a possibility that the operator fails or forgets to take the appropriate manipulation through the keyboard, to solve the unchanged algebraic formula or formulas, due to a change of some numerical values in the existing table. In this case, the data table contains an erroneous value or values as the result or results of the unchanged algebraic formula or formulas. Moreover, the operator may designate the algebraic formulas which need not be solved upon changing of some numerical values in the existing data table.

SUMMARY OF THE INVENTION

It is therefore an object of the present invention to provide a text processing system which permits efficient creation and change of a data table without unnecessary re-calculation to solve mathematical expressions as experienced in the prior art, and which assures required re-calculation to solve algebraic formulas which include address codes representative of numerical values listed in the table, upon changing of any numerical values represented by such address codes and/or the algebraic formulas.

The above object may be achieved according to a text processing system comprising: (a) data input means for entering data; (b) display means for displaying data entered through the data input means, the display having a display screen; (c) data table creating and calculating means, for (i) creating table data representative of a table of items including numerical values and at least one mathematical expression which are entered through the data input means and displayed in respective data areas of the display screen, (ii) performing a calculating operation to solve each mathematical expression, and (iii) displaying a result of the calculating operation together with said items, the table data including sets of item data representative of the numerical values and the result of the calculating operation, respectively; and (d) indicating means for providing an indication informing an operator of the system of a necessity of activating the data table creating and calculating means to effect re-calculation associated with at least one of the above-indicated at least one mathematical expression, if the at least one mathematical expression includes at least one algebraic formula each including address codes each of which specifies a corresponding one of the data areas and thereby represents the item in the specified data area, and if at least one of the items of the table once created by the data table creating and calculating means has been changed through the data input means.

In the text processing system of the present invention constructed as described above, numerical values and mathematical expressions which constitute major items of a desired table to be created are entered through the data input means, and calculating operations to solve the mathematical expressions are automatically performed. The results obtained by solving the mathematical expressions are also included in the table and also displayed on the display screen. The mathematical expressions may include at least one algebraic formula which includes address codes each specifying a corresponding one of the data areas in which the entered numerical values are accommodated. These address codes are replaced by the numerical values in the specified data areas, when the algebraic formulas are solved.

When a data table thus created and subjected to calculation is partially changed or updated in terms of its items (numerical values and/or mathematical expressions such as mathematical or algebraic formulas), there arises a need of performing re-calculating operations to solve the mathematical expressions which have been changed, or the algebraic formulas which remain unchanged but include address codes representing the changed numerical values. The indicating means of the present text processing system is adapted to provide an indication prompting the operator to take an appropriate action to perform the required re-calculating operations to solve such mathematical expressions or algebraic formulas. That is, if any of the already entered items (including mathematical expressions) of the table has been changed and if the table of items include any algebraic formula which includes address codes specifying the data areas of any numerical values (either changed or unchanged values) in the table, the indicating means is activated to inform the operator of the need of solving at least the algebraic formulas including such address codes that specify the numerical values which have been changed.

According to the present invention, therefore, the text processing system may be adapted so as to inhibit automatic re-calculation to solve all the mathematical expressions, when the numerical values entered to change an existing data table are the same as the corresponding original values. Further, the automatic re-calculation will not be effected where the data table in question does not include any algebraic formula, even if any numerical values in the table have been changed. Thus, the present text processing system does not suffer from the conventionally experienced unnecessary re-calculation during data entry to to update or change an existing or already created data table. Further, the indicating means reminds the operator of the necessity of effecting the required re-calculation to solve the changed mathematical expressions, and the algebraic formulas including address codes representative of any numerical values which have been changed. Accordingly, the data table can be correctly updated, with the correct results of the summing operations according to the changed mathematical expressions, for example.

Usually, the data areas area defined by a plurality of parallel rows and a plurality of parallel columns perpendicular to the rows, and a plurality of algebraic formulas are included in the appropriate data areas. For instance an algebraic formula in a given data area consists of a plurality of address codes representing the numerical values in the data areas in a predetermined one of the rows or columns, and at least one operator for addition for summing the numerical values in the data areas in the predetermined row or column.

Preferably, the indicating means is activated to provide the above-described indication, immediately before the table data are stored in appropriate memory means, or immediately before the table represented by the table data is printed. For instance, the indicating means may be activated in response to an appropriate command produced upon operation of a suitable key on the data input means, which is used to store the table data in the memory means. Alternatively, the indicating means is activated to provide the indication when appropriate printing means is commanded by the operator to start printing the data table.

As described above, the indicator means is adapted to provide the indication provided any item of the table has been changed and provided the table includes any algebraic formula, irrespective of whether the item which has been changed is represented by an address code in the algebraic formula. However, it is possible that the indication is provided only if the table includes any algebraic formula inducing any address codes which represent any numerical values which have been changed.

The data input means may preferably comprise an appropriate key for producing a re-calculation command for activating the data table creating and calculating means to perform re-calculating operations to solve all of the mathematical expressions included in the table.

It is desirable to provide the present system with suitable operator-controlled selecting means which is operable by the operator upon activation of the indicating means, for selecting a first mode in which the data table creating and calculating means is activated to effect the re-calculation associated with the mathematical expression or expressions, or a second mode in which the data table creating and calculating means is not activated to effect the re-calculation. The data table creating and calculating means may be adapted to effect the re-calculation to solve all the mathematical expressions included in the table, when the first mode is selected.

BRIEF DESCRIPTION OF THE DRAWINGS

The above and other objects, features and advantages of the present invention will be better understood by reading the following detailed description of a presently preferred embodiment, when considered in connection with the accompanying drawings, in which:

FIG. 8 is a view indicating an example of a display screen when a numerical value is entered as an item of the data table;

FIG. 9 is a view indicating an example of a display screen immediately after an algebraic formula is entered as an item of the table;

FIG. 10 is a view indicating a display screen showing the data table completed with all the algebraic formulas being solved;

FIG. 11 is a view corresponding to that of FIG. 10, showing a change of one of the numerical values in the table;

FIG. 12 is a view corresponding to that of FIG. 10, showing a message which is superimposed on the table to indicate the necessity of re-calculating operations on the table; and FIG. 13 is a view corresponding to that of FIG. 10, showing the table which includes correct results obtained by the re-calculating operations.

DETAILED DESCRIPTION OF THE PREFERRED EMBODIMENT

Figure 1:
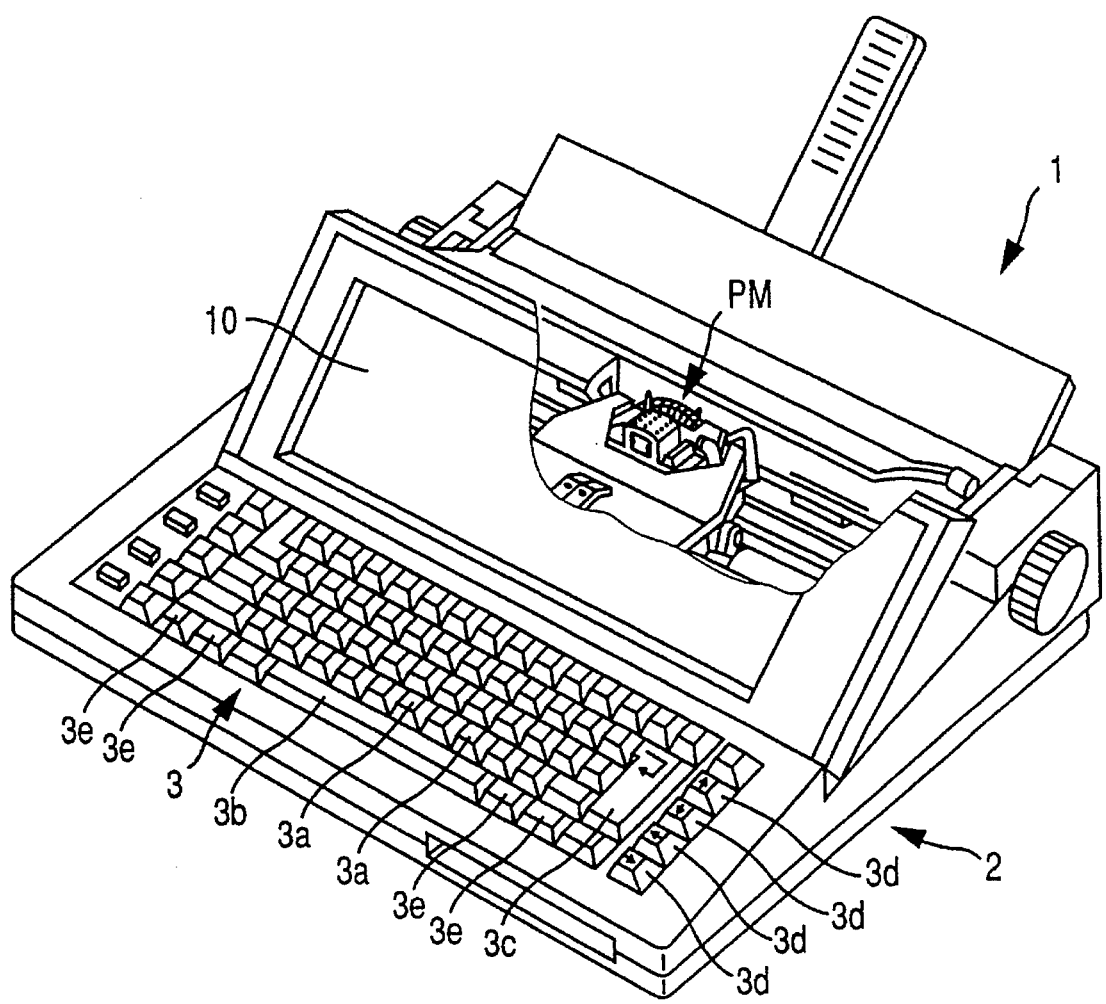
FIG. 1 is a perspective view of a word processor constructed according to one embodiment of the present invention.

Referring first to FIG. 1, there is shown a word processor 1 in the form of an electronic typewriter as one form of the text processing system constructed according to the present invention, which is adapted to deal with the English language and has a spread-sheet calculating function, namely, a function of performing calculating operations to solve mathematical expressions (mathematical or algebraic formulas) included in a table or spread sheet. The table as completed includes the results of the calculating operations.

The word processor 1 has a keyboard 3 disposed on a front part of a frame structure 2, and a printing mechanism PM disposed behind the keyboard 3 and within a rear part of the frame structure 2. The printing mechanism PM uses a type wheel which carries a family of fonts for printing a text consisting of characters such as letters, numerals and symbols. The word processor 1 is equipped with a liquid crystal display (LCD) 10 between the keyboard 3 and the printing mechanism PM. The LCD 10 has a display screen capable of displaying a text, more precisely, up to a predetermined number of lines at a time.

The keyboard 3 has character keys 3a for entering characters such as alphabetic letters, numerals and symbols, a space key or bar 3b for entering a space, a CARRIAGE RETURN key 3c, and cursor keys 3d for moving a cursor on the display screen of the LCD 10 in the leftward, rightward, upward and downward directions, respectively. In a spread-sheet creation mode of the word processor 1, the display cursor may be used as a block cursor BK for specifying divided areas on the display screen, which correspond to the data areas of a data table or spread sheet, as indicated in FIGS. 7–13. The CARRIAGE RETURN key 3c is used to effect a carriage return as well known in the art, and has other functions which will be apparent from the following description. The keyboard 3 further has various function keys 3e such as a RE-CALC. key for producing a re-calculation command to effect re-calculating operations on an existing data table upon changing of any item in the table, and a TABLE STORE key for producing a table storing command to store text data in a TEXT memory 32 (which will be described) or table data in a SPREAD-SHEET DATA memory 33 (which will be described).

The printing mechanism PM includes a platen, a line-feed motor for rotating the platen to feed a recording medium, a carriage carrying a print head, a carriage-drive motor for reciprocating the carriage, and a wheel-index motor for rotating the type wheel mounted on the print head, as well known in the art. No detailed description of the printing mechanism PM is deemed necessary for understanding the principle of the present invention.

Figure 2:
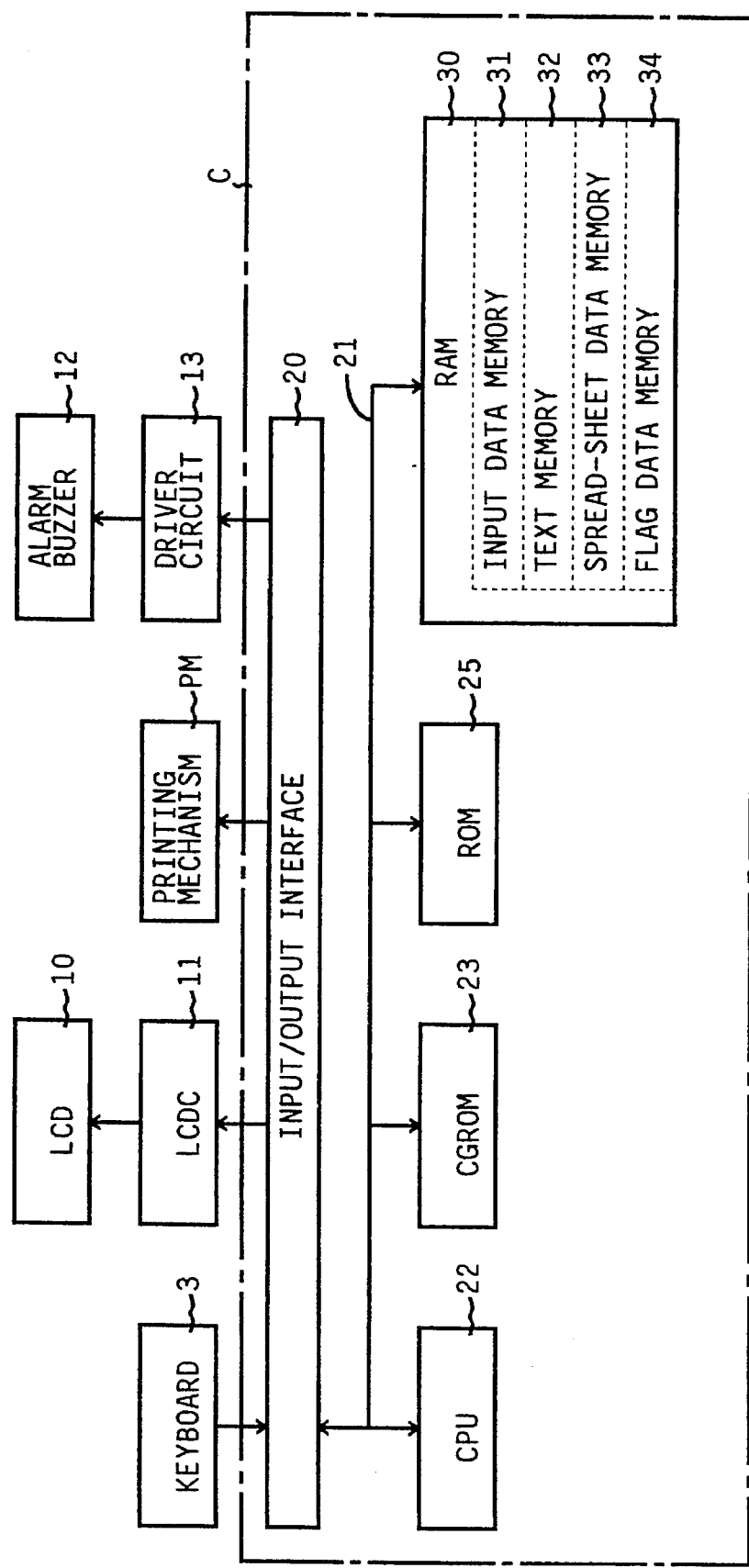
FIG. 2 is a schematic block diagram showing a control system of the word processor of FIG. 1.

Referring next to the block diagram of FIG. 2, there will be described a control system for the word processor 1.

The control system uses a controller C having an input/output interface 20 to which are connected the keyboard 3, the printing mechanism PM, a display controller (LCDC) 11 for the LCD 10, and a driver circuit 13 for activating an alarm buzzer 12. The display controller 11 incorporates a random-access memory and controls the LCD 10. The controller C includes a central processing unit (CPU) 20, a character generator read-only memory (CGROM) 23, a read-only memory (ROM) 25, and a random-access memory (RAM) 30, which are interconnected to each other and connected to the input/output interface, by a bus 21.

The CGROM 23 stores a batch of bit-map font data or dot data representative of multiple characters of a font family, together with and in relation to respective character codes identifying the corresponding characters. Each set of dot data represents the corresponding character in a matrix of dots.

The RAM 30 includes an INPUT DATA memory 31 for temporarily storing text data and table data entered through the keyboard 3, the TEXT memory 32 and the SPREAD-SHEET DATA memory 33 indicated above, and a FLAG DATA memory 34. The TEXT memory 32 is provided for storing the text data which are once stored in the INPUT DATA memory 31 in a text creation mode, while the SPREAD-SHEET DATA memory 33 is provided for storing the table data which are also once stored in the memory 31 in the spread-sheet creation mode. The FLAG DATA memory 33 will be described later.

Figure 3:
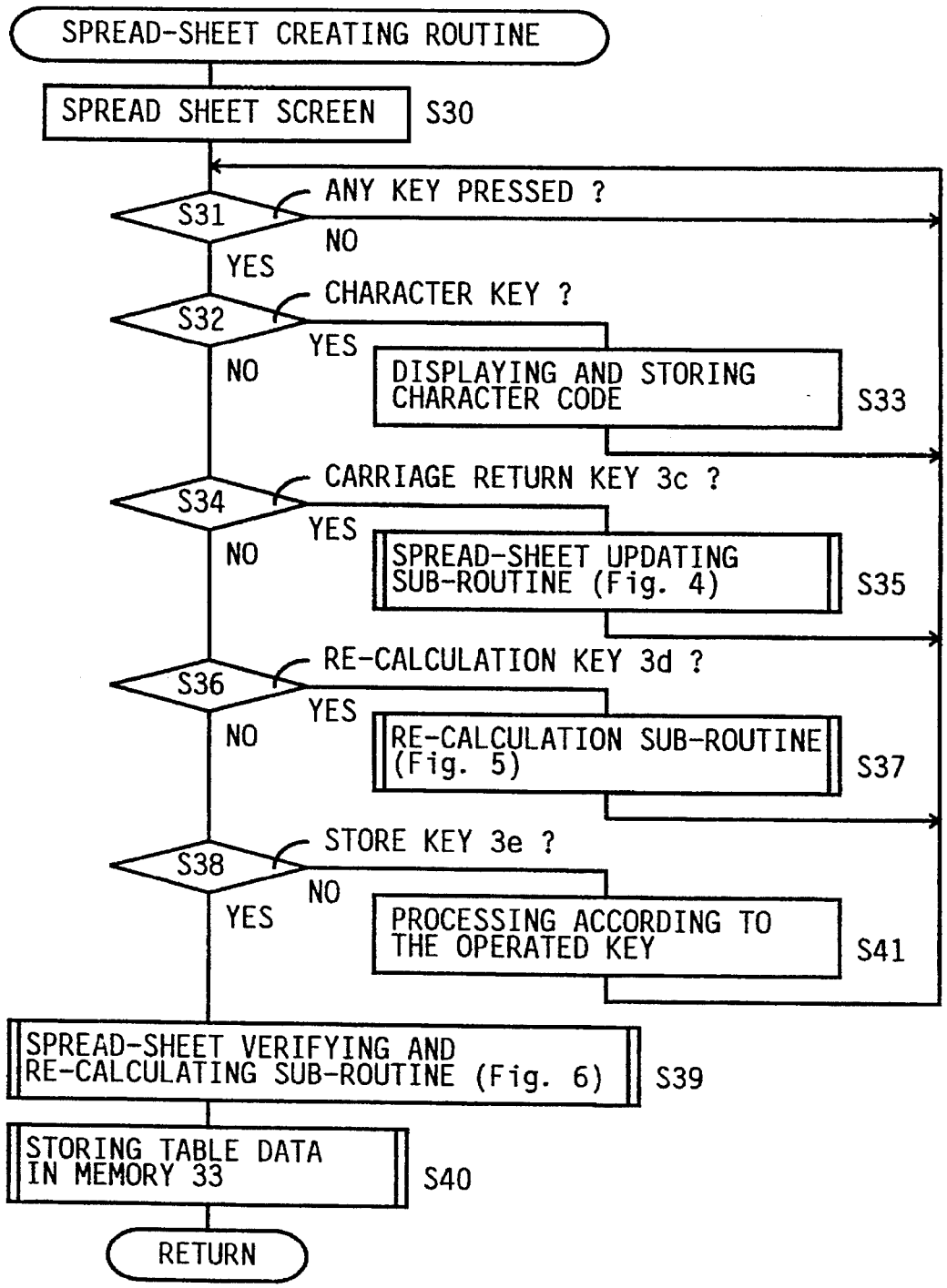
FIG. 3 is a flow chart schematically illustrating a spread-sheet creating routine.

The ROM 25 stores various control programs such as: a display control program for controlling the display controller (LCDC) 11 on the basis of the character codes received from the keyboard 3 and stored in the INPUT DATA memory 31, and the bit-map font data stored in the CGROM 23; a text creation control program for creating a text in the text creation mode, by storing character codes (text data) in the TEXT memory 32; a printing control program for controlling the carriage-drive motor and the wheel-drive motor of the printing mechanism PM, to print on a recording medium a text and/or a data table, according to the text data stored in the TEXT memory 32 and the table data (spread-sheet data) stored in the SPREAD-SHEET DATA memory 33; and a control program for executing a spread-sheet creating routine as illustrated in the flow chart of FIG. 3, according to the principle of the present invention, as described below in detail.

Figure 7:
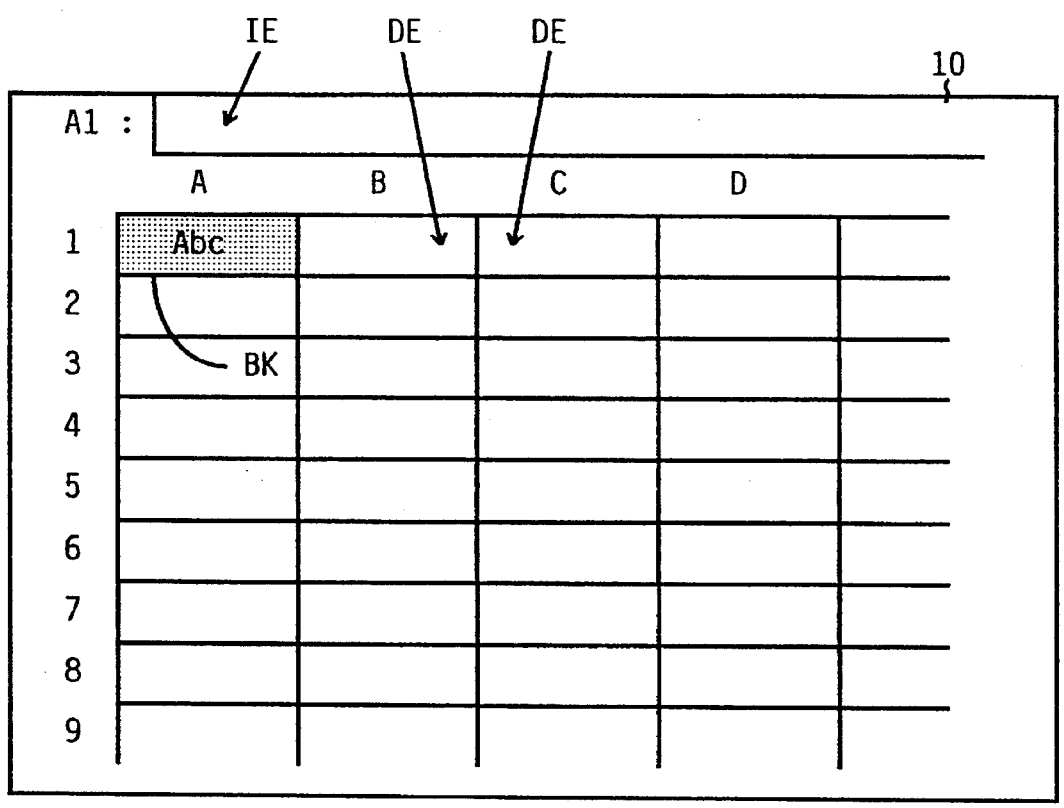
FIG. 7 is a view indicating an example of a display screen of the processor in a spread-sheet creation mode in which a data table is created.

The spread-sheet creating routine includes calculating operations to solve mathematical expressions (in the form of mathematical formulas or algebraic formulas) contained in respective data areas (data cells) DE of a data table, and an operation to display the results of the calculating operations. The data areas DE of the data table are defined by a plurality of parallel rows (1, 2, 3, . . . ) and a plurality of parallel columns (A, B, C, . . . ) perpendicular to the rows, as indicated in FIG. 7. The data areas DE are identified by respective combinations of a row address (1, 2, 3, . . . ) and a column address (A, B, C, . . . ). As explained above in the "Description of the Related Art", the data areas DE accommodate either numerical values, or algebraic formulas which may include operands represented by address codes each consisting of a combination of the row and column addresses of one of the data area DE. In the spread-sheet creation-calculation mode, those address codes are interpreted to represent the numerical values accommodated in the corresponding data areas DE.

The data contained in the data areas are processed differently in the spread-sheet creation-calculation mode, from the ordinary text data processed in the text creation mode. In other words, the spread-sheet creating routine indicated above is executed in the spread-sheet creation-calculation mode in which the data are processed according to the spread-sheet calculation format, while the text creation control program indicated above is executed in the text creation mode in which the data are processed according to the text creation format.

Figure 6:
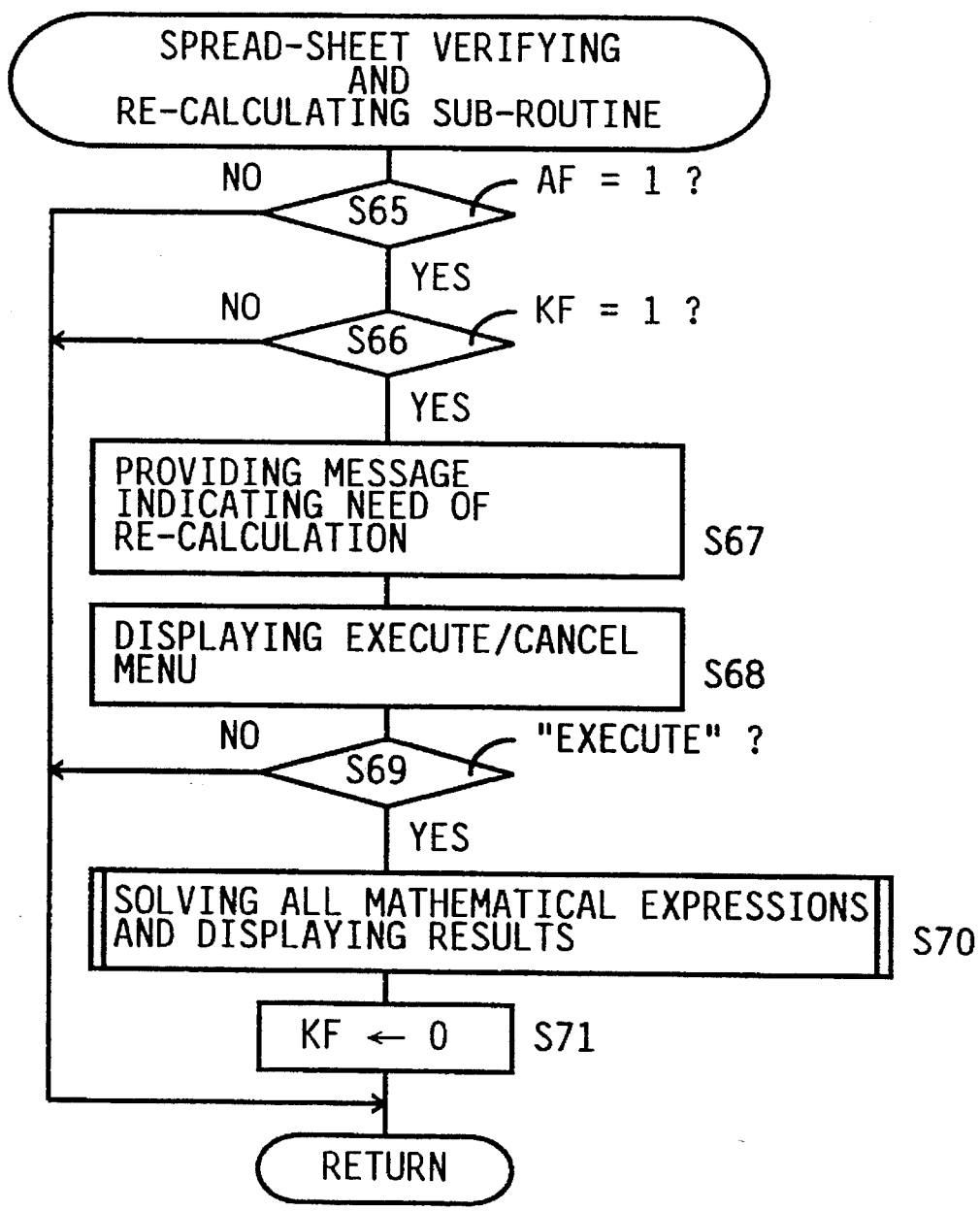
FIG. 6 is a flow chart schematically illustrating a spread-sheet verifying and re-calculating sub-routine in the routine of FIG. 3.

The FLAG DATA memory 34 is used to store: an UPDATE flag KF which is set to "1" when a numerical value or a mathematical expression in a data table is changed or updated; an ADDRESS flag AF which is set to "1" when the data table includes an algebraic formula including any address code; and a RE-CALCULATION flag RF which is set to "1" if the block cursor BK is moved to an item "EXECUTE" in a selection menu provided on the display screen of the LCD 10 in step S68 of the spread-sheet verifying and re-calculating sub-routine of FIG. 6, which will be described.

Upon application of power to the word processor 1, the LCD 10 provides a main menu listing items of operations available on the word processor 1, which items include operations entitled: CREATE AND EDIT TEXT; CREATE PRINTING FORMAT; CREATE AND CALCULATE SPREAD SHEET; and PRINT. When the item "CREATE AND CALCULATE SPREAD SHEET" is selected by the operator, the spread-sheet creation-calculation mode is established, and the spread-sheet creating routine of FIG. 3 is initiated.

The routine of FIG. 3 is initiated with step S30 in which the LCD 10 provides a display screen for creating and calculating a data table, as indicated in FIG. 7 by way of example. The screen includes an input character display area 1E on which characters entered through the keyboard 3 are displayed, and the plurality of data areas DE defined by the rows (1, 2, 3, . . . ) and columns (A, B, C, . . . ). In this state, the block cursor BK is aligned with the data area A1 defined by an address code A1 (column address A and row address 1), which is the left upper corner data area of the table to be created.

Step S30 is followed by step S31 to determine whether any key such as a character key 3a on the keyboard 3 has been operated. Step S31 is repeatedly implemented. If any character key 3a is operated, the control flow goes to step S32 to determine whether the operated key is any character key 3a. If any character key 3a has been operated, step S32 is followed by step S33 in which the character code corresponding to the operated character key 3a is stored in the INPUT DATA memory 31 and displayed in the input character display area 1E on the display screen of the LCD 10. Then, the control flow returns to step S31. Thus, characters such as letters, numerals and symbols (representative of operators used in an algebraic formula) are successively keyed in to enter a desired item to be contained in a data table. When the CARRIAGE RETURN key 3c is operated after entry of successive characters of the desired item in the table, step S34 is followed by step S35 to execute a spread-sheet updating sub-routine as illustrated in the flow chart of FIG. 4.

Figure 4:
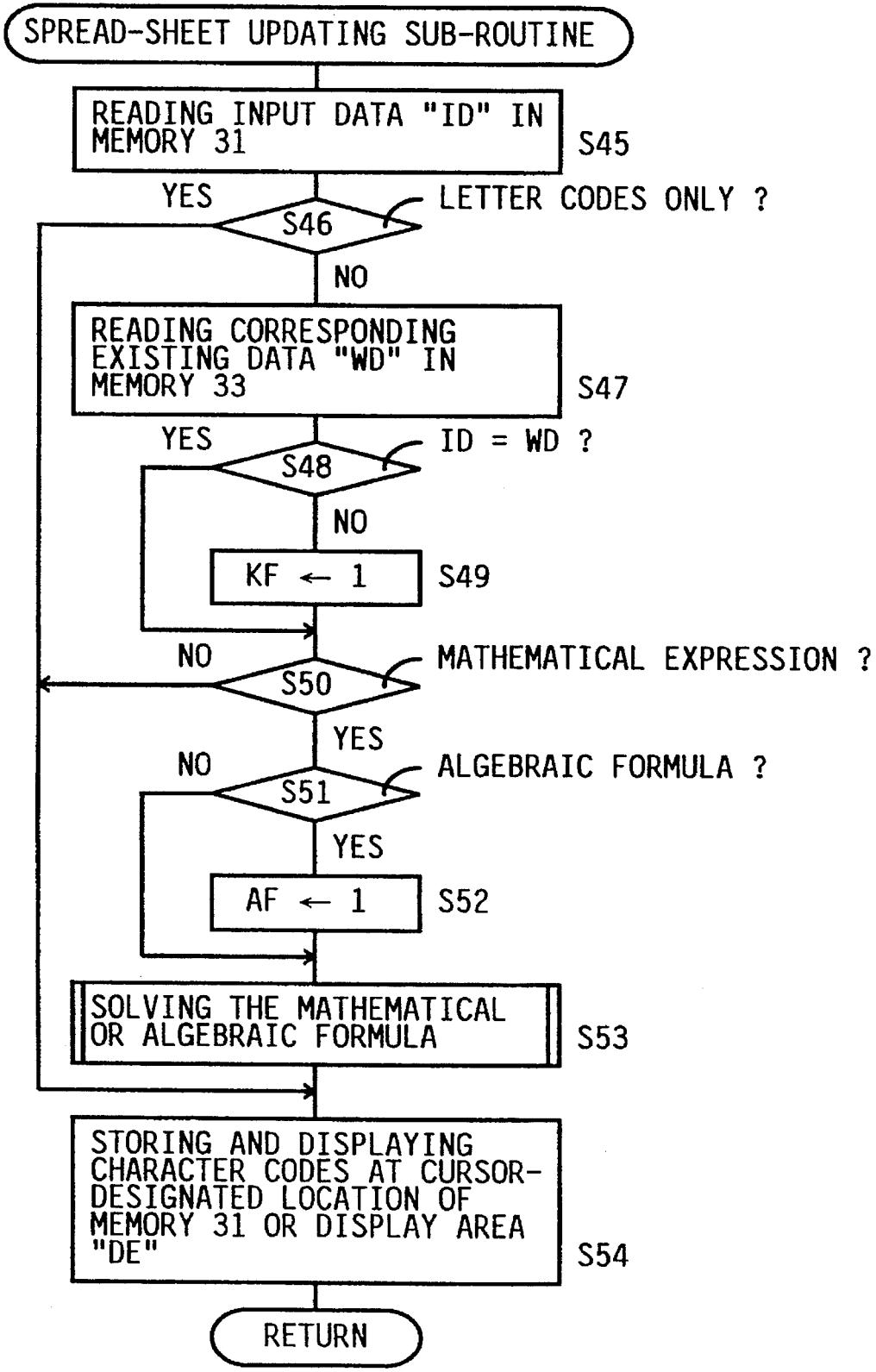
FIG. 4 is a flow chart schematically illustrating a spread-sheet updating sub-routine in the routine of FIG. 3.

The sub-routine of FIG. 4 is initiated with step S45 to read out input data ID stored in the INPUT DATA memory 31 and displayed in the display area 1E on the LCD 10. Then, step S46 is implemented to determine whether the successive characters of the input data ID are all character codes corresponding to successive letters. If an affirmative decision (YES) is obtained in step S46, the control flow goes to step S54 in which the character codes are stored at the memory location of the INPUT DATA memory 31 which is currently designated by the block cursor BK, and the corresponding letters are displayed in the data area DE of the LCD 10 also designated by the block cursor BK. Then, the control returns to step S31 of the routine of FIG. 3. In the example of FIG. 7, successive letters "Abc" entered through the letter keys on the keyboard 3 are displayed in the data area A1 on the LCD 10, and the character codes corresponding to the letters "Abc" are stored as the input data ID at the memory location of the INPUT DATA memory 31 which corresponds to the data area A1. It is noted that the letters "Abc" in the first row of the first column A of the table constitute a legend for the numerical values to be listed in the following rows of the same column A.

If all the entered characters represented by the input data ID read out in step S45 are not successive letters, this means that the entered characters constitute either a numerical value or a mathematical expression. In this case, a negative decision (NO) is obtained in step S46, and step S47 is implemented to read out existing data WD which may be already stored in the memory location of the SPREAD-SHEET DATA memory 33 which is currently designated by the block cursor BK. Step S47 is followed by step S48 to determine whether the input data ID stored in the INPUT DATA memory 31 are identical with the existing data WD stored in the SPREAD-SHEET DATA memory 33. If a negative decision (NO) is obtained in step S48, step S49 is implemented to set the UPDATE flag KF to "1". That is, if the existing data WD are replaced by the new data ID, this means that the existing table is at least partially updated or changed, and the UPDATE flag KF is set. If no existing data WD are stored, it is considered that the existing data WD are replaced by the new data ID.

Figure 8:
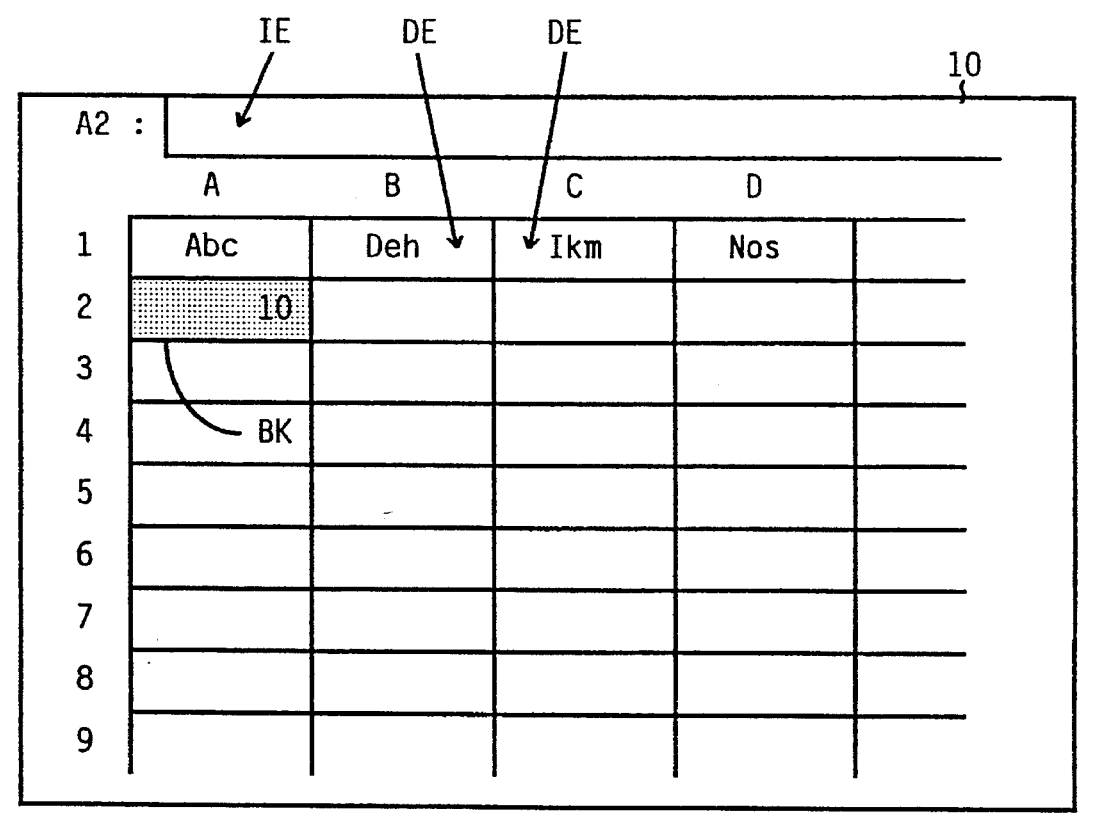

When an affirmative decision (YES) is obtained in step S48 or after step S49 is implemented, step S50 is implemented to determine whether the input data D (character codes) represent a mathematical expression or not. If the input data ID do not represent a mathematical expression, this means that the input data ID represents a numerical value. In this case, a negative decision (NO) is obtained in step S50, and the control flow goes to step S54 in which the character codes of the INPUT data ID are stored in the memory location of the memory 31 designated by the block cursor BK, and the corresponding numerical value is displayed in the data area on the LCD 10 which corresponds to the memory location. In the example of FIG. 8, a numerical value "10" is entered as the input data ID when the block cursor BK is located at the data area A2 and when no existing data WD are stored in the corresponding memory location of the SPREAD-SHEET DATA memory 33. In this case, the UPDATE flag KF is set to "1" and the numerical value "10" is displayed in the data area A2. Upon completion of step S54, the control returns to step S31.

If the input data ID represents a mathematical expression consisting of a plurality of numerical values and at least one operator (represented by a mathematical operation symbol such as "+", "−", "×" and "÷"), an affirmative decision (YES) is obtained in step S50, and step S51 is implemented to determine whether the mathematical expression is an algebraic formula including address codes each consisting of a row address and a column address which specify one of the data areas DE. If the mathematical expression does not include such address codes, the control flow goes directly to step S53. If the mathematical expression is an algebraic formula including address codes, step S52 is implemented to set the ADDRESS flag AF to "1" before step S53 is implemented. In step S53, the mathematical expression (either mathematical formula or algebraic formula) is solved to obtain a result. If the algebraic formula "A2+B2+C2" is entered when the block cursor BK is located at the data area D2 as indicated in FIG. 9, step S52 is implemented to set the ADDRESS flag AF, and the formula is solved in step S53 by summing the numerical values "10", "20" and "30", whereby the sum "60" is obtained as shown in FIG. 9. The result obtained by solving the algebraic formula in step S53 is stored in the appropriate memory location of the INPUT DATA memory 31 and displayed in the corresponding data area (D2 in the example of FIG. 9) of the LCD 10.

It will be understood from the above explanation that the UPDATE flag KF is set either when the entered new data ID are different from the corresponding existing data WD or when the new data ID are entered without the corresponding existing data WD, and that the ADDRESS flag AF is set when the items of the table include any algebraic formula which includes address codes representative of the numerical values in the data areas DE.

Figure 5:
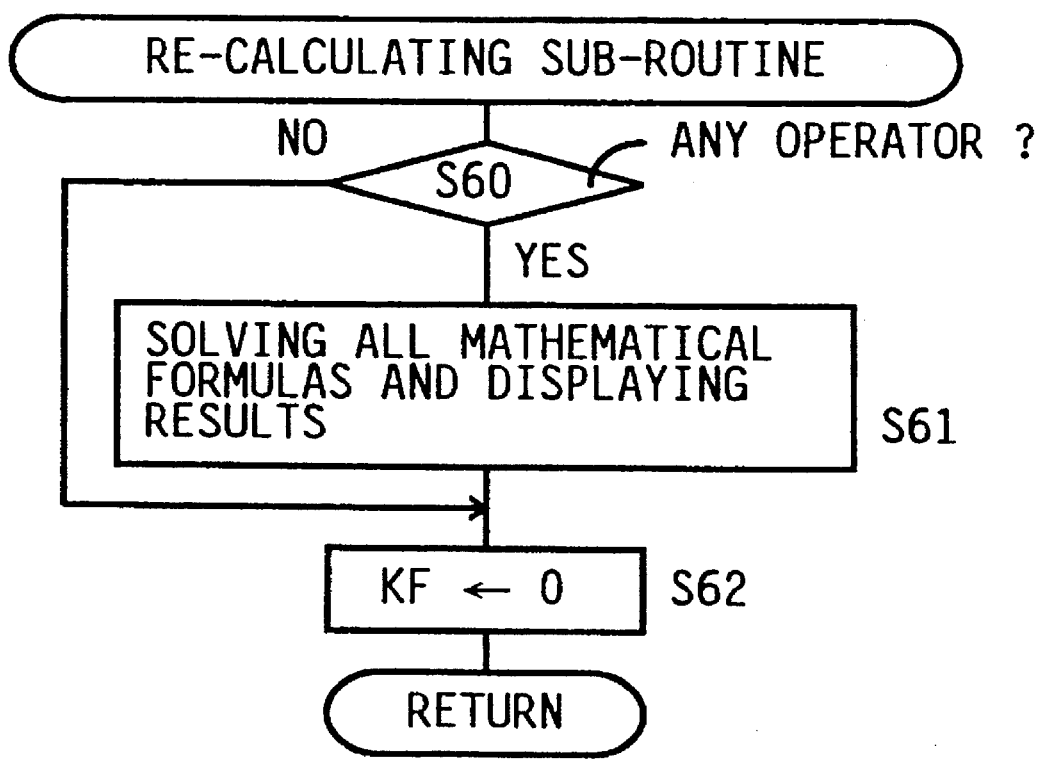
FIG. 5 is a flow chart schematically illustrating a re-calculating sub-routine in the routine of FIG. 3.

Referring back to the flow chart of FIG. 3, when the RE-CALC key 3e on the keyboard 3 is operated to produce the re-calculation command, an affirmative decision (YES) is obtained in step S36, and step S37 is implemented to execute a re-calculating sub-routine as illustrated in the flow chart of FIG. 5. This RE-CALC. key is usually operated after completion of data entry for changing or modifying an existing data table, in order to effect re-calculating operations to solve all the mathematical expressions (generally, algebraic formulas) contained in the changed data table. The sub-routine of FIG. 5 is initiated with step S60 to scan the input data ID stored in the INPUT DATA memory 31, for finding any operators included in the input data ID. If any operator is found, step S61 is implemented to perform re-calculating operations to solve all mathematical expressions (including the mathematical formulas) included in the input data ID, and display the obtained results of the formulas in the appropriate data areas DE. Step S61 is followed by step S62 to reset the UPDATE flag KF to "0". Then, the control returns to step S31 of the routine of FIG. 3.

If the operator presses the RE-CALC. key 3e after the numerical value "15" in the data area B3 of an existing data table as illustrated in FIG. 10 is changed to "25" as as shown in FIG. 11, for instance, the algebraic formulas included in the data areas A4, B4, C4 and D2–D4 are all solved in step S61 of the sub-routine of FIG. 5, and the results of the operations to solve the formulas are displayed in the appropriate data areas, as indicated in FIG. 13. Consequently, the erroneous sums "35" and "75" in the data areas B4 and D3 are replaced by the respective correct sums "45" and "85" which are obtained by solving the algebraic formula "B2+B3" and "A3+B3+C3", respectively. The newly obtained results of the formulas are retained in the memory 31 in step S61.

If the STORE key 3e on the keyboard 3 is operated to produce the table storing command, an affirmative decision (YES) is obtained in step S38, and step S39 is implemented to execute a spread-sheet verifying and re-calculating sub-routine as illustrated in the flow chart of FIG. 6. If both of the ADDRESS flag AF and the UPDATE flag KF are both set at "1", that is, if an affirmative decision (YES) is obtained in both steps S65 and S66, the control flow goes to step S67 in which the display screen of the LCD 10 provides a message prompting the operator to effect re-calculation to solve some algebraic formulas since these formulas have wrong results due to some change in the data table. For example, the flags AF and KF are both set at "1", and step S67 is implemented to provide the warning message, if the operator presses the STORE key 3e without prior operation of the RE-CALC. key 3e (without prior execution of the sub-routine of FIG. 5), after the numerical value "15" in the data area B3 of the data table as shown in FIG. 10 has been changed to "25" as shown in FIG. 11. The ADDRESS flag AF was set to "1" since the created data table includes the algebraic formulas, and the UPDATE flag KF was set to "1" since the numerical value "15" was changed to "25".

In step S67, the display screen also provides a selection menu which permits the operator to select a mode in which calculating operations are performed to solve all the mathematical expressions included in the updated or changed data table, or a mode in which such calculating operations are not effected. The menu has two items "EXECUTE" and "CANCEL" which correspond to the above-indicated two modes. If the item "EXECUTE" is selected by the block cursor BK, the RE-CALCULATION flag RF in the FLAG DATA memory 34 is set to "1", and an affirmative decision (YES) is obtained in step S69, whereby step S70 is implemented to perform re-calculating operations to solve all the mathematical expressions included in the data table under preparation, and display the obtained results in the appropriate data areas DE, as in step S61. The results are retained in the memory 31. Step S70 is followed by step S71 to reset the UPDATE flag KF. The control then goes to step S40 of the spread-sheet creating routine of FIG. 3. In step S40, the entire table data stored in the INPUT DATA memory 31 are stored in the SPREAD-SHEET DATA memory 33, and displayed on the display screen as shown in FIG. 13, by way of example. The displayed data table includes the correct values "45" and "85" in the respective data areas B4 and D4, which have been obtained in step S70. The routine of FIG. 3 is terminated with step S40.

If the item "CANCEL" of the selection menu is selected by the block cursor BK in step S68, the RE-CALCULATION flag RF remains "0", and a negative decision (NO) is obtained in step S69, step S70 is not implemented, and the control returns to step S31 of the routine of FIG. 3. The sub-routine of FIG. 6 is also terminated without implementation of step S70 when the ADDRESS flag AF or the UPDATE flag KF is not set at "1".

If a negative decision (NO) is obtained in step S38, the control flow goes to step S41 in which a function according to the operated key is performed.

As described above, the present word processor 1 is capable of creating a desired data table which includes numerical values entered through the keyboard 3, and results (numerical values) automatically obtained by solving mathematical expressions also entered through the keyboard. The data representative of the table are stored in the SPREAD-SHEET DATA memory 33. Further, the controller C of the processor 1 is adapted such that the LCD 10 provides the warning message prompting the operator to effect re-calculation to solve all the mathematical expressions of the table, if the flags AF and KF are both set at "1", namely, when a data table including any algebraic formula is newly created, or when an existing table is updated or changed of any algebraic formulas or any numerical value represented by any address codes used in the algebraic formulas (either changed or unchanged). For example, if one of the numerical values in the existing or already created data table is changed but the table does not include any algebraic formula, the warning message is not provided, that is, steps S67–S71 of the sub-routine of FIG. 6 are not implemented. Thus, unnecessary re-calculating operations to solve the mathematical formula which do not include address codes are not performed in this case. If, on the other hand, any algebraic formula including address codes is changed, or any numerical value used as an operand in any algebraic formula is changed, the warning message is provided in step S67, and re-calculation to solve all the mathematical expressions (including the algebraic formulas) in the data table is effected in step S70 if the operator selects the item "EXECUTE" in step S68. Thus, the results of the changed mathematical expressions can be updated or corrected, immediately before the changed table data are stored in the SPREAD-SHEET DATA memory 33 in step S40. Thus, the present word processor 1 permits efficient creation and updating of a data table, without unnecessary re-calculation of mathematical expressions, but assures required re-calculation to solve algebraic formulas including address codes if these algebraic formulas are changed or if any numerical values represented by such address codes are changed.

It will be understood that the ROM 25 storing the routine of FIG. 3 (sub-routine of FIG. 6) and the portion of the controller C assigned to execute steps S65–S67 constitute indicating means for providing an indication informing the operator of the necessity of performing re-calculation to solve some mathematical expressions, if a data table includes any algebraic formula and if any item of the table has changed.

While step S39 (sub-routine of FIG. 6) is implemented upon operation of the STORE key 3e to store the created or updated table data in the SPREAD-SHEET DATA memory 33, the step S39 may be implemented when the item "PRINT" is selected on the main menu to start printing the created data table.

Although step S37 (sub-routine of FIG. 5) is formulated such that all the mathematical expressions included in the data table are solved in step S61, it is possible to effect re-calculation to solve only the changed mathematical expressions and the unchanged algebraic formulas including address codes representative of the changed or updated numerical values.

The spread-sheet updating sub-routine of FIG. 4 used in the illustrated embodiment is formulated such that the UPDATE flag KF is set if any one of the items (numerical values, and mathematical expressions) of the data table is newly entered or changed, and the ADDRESS flag AF is set if the data table includes any algebraic formula. However, the flag KF may be provided for each of the items of the table (i.e., for each of the data areas DE), so that only the algebraic formulas including the address codes representative of the data areas DE whose numerical values (which may take the form of mathematical formulas) have been changed are solved in step S70 of the spread-sheet verifying and re-calculating sub-routine of FIG. 6. In this case, unnecessary re-calculations to solve the algebraic formulas including the address codes representative of the unchanged numerical values are eliminated, whereby the table creating and updating efficiency is further improved.

While the present invention has been described in detail in its presently preferred embodiment, it is to be understood that the present invention is not limited to the details of the illustrated embodiment, but may be embodied with various other changes, modifications and improvements, which may occur to those skilled in the art, without departing from the spirit and scope of the invention defined in the following claims.

What is claimed is:

1. A text processing system comprising:

data input means for entering data;

display means for displaying data entered through said data input means, said display having a display screen;

data table creating and calculating means, for creating table data representative of a table of items including numerical values and at least one mathematical expression which are entered through said data input means and displayed in respective data areas of said display screen, performing a calculating operation to solve each of said at least one mathematical expression, and displaying a result of said calculating operation together with said items, said table data including sets of item data representative of said numerical values and said result, respectively; and indicating means for providing an indication informing an operator of the system of a necessity of activating said data table creating and calculating means to effect re-calculation associated with at least one of said at least one mathematical expression, if said at least one mathematical expression includes at least one algebraic formula each including address codes each of which specifies a corresponding one of said data areas and thereby represents the item in the specified data area, and if at least one of said items of said table once created by said data table creating and calculating means has been changed through said data input means, wherein said data areas are defined by a plurality of parallel rows and a plurality of columns perpendicular to said rows, and said at least one algebraic formula consists of a plurality of algebraic formulas each of which includes a plurality of address codes representing the numerical values in the data areas in a predetermined one of said rows and columns, and at least one operator for addition for summing the numerical values in the data areas in said predetermined one of the rows and columns.

2. A text processing system comprising:

data input means for entering data;

display means for displaying data entered through said data input means, said display having a display screen;

data table creating and calculating means, for creating table data representative of a table of items including numerical values and at least one mathematical expression which are entered through said data input means and displayed in respective data areas of said display screen, performing a calculating operation to solve each of said at least one mathematical expression, and displaying a result of said calculating operation together with said items, said table data including sets of item data representative of said numerical values and said result, respectively;

indicating means for providing an indication informing an operator of the system of a necessity of activating said data table creating and calculating means to effect re-calculation associated with at least one of said at least one mathematical expression, if said at least one mathematical expression includes at least one algebraic formula each including address codes each of which specifies a corresponding one of said data areas and thereby represents the item in the specified data area, and if at least one of said items of said table once created by said data table creating and calculating means has been changed through said data input means; and data table memory means for storing said table data, wherein said data input means comprises a table store key for producing a table storing command for storing said table data in said table data memory means, said indicating means being activated to provide said indication in response to said table storing command.

3. A text processing system comprising:

data input means for entering data;

display means for displaying data entered through said data input means, said display having a display screen;

data table creating and calculating means, for creating table data representative of a table of items including numerical values and at least one mathematical expression which are entered through said data input means and displayed in respective data areas of said display screen, performing a calculating operation to solve each of said at least one mathematical expression, and displaying a result of said calculating operation together with said items, said table data including sets of item data representative of said numerical values and said result, respectively;

indicating means for providing an indication informing an operator of the system of a necessity of activating said data table creating and calculating means to effect re-calculation associated with at least one of said at least one mathematical expression, if said at least one mathematical expression includes at least one algebraic formula each including address codes each of which specifies a corresponding one of said data areas and thereby represents the item in the specified data area, and if at least one of said items of said table once created by said data table creating and calculating means has been changed through said data input means; and printing means for printing said table of items according to the table data created by said data table creating and calculating means, wherein said indicating means is activated to provide said indication when said printing means is commanded by the operator to start printing said table.

4. A text processing system comprising:

data input means for entering data;

display means for displaying data entered through said data input means, said display having a display screen;

data table creating and calculating means, for creating table data representative of a table of items including numerical values and at least one mathematical expression which are entered through said data input means and displayed in respective data areas of said display screen, performing a calculating operation to solve each of said at least one mathematical expression, and displaying a result of said calculating operation together with said items, said table data including sets of item data representative of said numerical values and said result, respectively; and indicating means for providing an indication informing an operator of the system of a necessity of activating said data table creating and calculating means to effect re-calculation associated with at least one of said at least one mathematical expression, if said at least one mathematical expression includes at least one algebraic formula each including address codes each of which specifies a corresponding one of said data areas and thereby represents the item in the specified data area, and if at least one of said items of said table once created by said data table creating and calculating means has been changed through said data input means, wherein said indicating means is activated to provide said indication irrespective of whether said at least one item of the table which has been changed is associated with said at least one algebraic formula.

5. A text processing system comprising:

data input means for entering data;

display means for displaying data entered through said data input means, said display having a display screen;

data table creating and calculating means, for creating table data representative of a table of items including numerical values and at least one mathematical expression which are entered through said data input means and displayed in respective data areas of said display screen, performing a calculating operation to solve each of said at least one mathematical expression, and displaying a result of said calculating operation together with said items, said table data including sets of item data representative of said numerical values and said result, respectively; and indicating means for providing an indication informing an operator of the system of a necessity of activating said data table creating and calculating means to effect re-calculation associated with at least one of said at least one mathematical expression, if said at least one mathematical expression includes at least one algebraic formula each including address codes each of which specifies a corresponding one of said data areas and thereby represents the item in the specified data area, and if at least one of said items of said table once created by said data table creating and calculating means has been changed through said data input means, wherein said indicating means is activated to provide said indication only when said at least one item of the table which has been changed is associated with said at least one algebraic formula.

6. A text processing system according to claim 5, wherein said indicating means is activated to provide said indication only when said at least one algebraic formula includes at least one address code which represents said at least one item of the table which has been changed.

7. A text processing system according to claim 6, wherein said at least one item of the table which has been changed includes at least one of said numerical values which has been changed.

8. A text processing system according to claim 6, wherein said at least one item of the table which has been changed includes at least one of said at least one algebraic formula which has been changed.

9. A text processing system comprising:

data input means for entering data;

display means for displaying data entered through said data input means, said display having a display screen;

data table creating and calculating means, for creating table data representative of a table of items including numerical values and at least one mathematical expression which are entered through said data input means and displayed in respective data areas of said display screen, performing a calculating operation to solve each of said at least one mathematical expression, and displaying a result of said calculating operation together with said items, said table data including sets of item data representative of said numerical values and said result, respectively; and indicating means for providing an indication informing an operator of the system of a necessity of activating said data table creating and calculating means to effect re-calculation associated with at least one of said at least one mathematical expression, if said at least one mathematical expression includes at least one algebraic formula each including address codes each of which specifies a corresponding one of said data areas and thereby represents the item in the specified data area, and if at least one of said items of said table once created by said data table creating and calculating means has been changed through said data input means, wherein said indicating means is activated to command said display means to provide said indication.

10. A text processing system comprising:

data input means for entering data;

display means for displaying data entered through said data input means, said display having a display screen;

data table creating and calculating means, for creating table data representative of a table of items including numerical values and at least one mathematical expression which are entered through said data input means and displayed in respective data areas of said display screen, performing a calculating operation to solve each of said at least one mathematical expression, and displaying a result of said calculating operation together with said items, said table data including sets of item data representative of said numerical values and said result, respectively; and indicating means for providing an indication informing an operator of the system of a necessity of activating said data table creating and calculating means to effect re-calculation associated with at least one of said at least one mathematical expression, if said at least one mathematical expression includes at least one algebraic formula each including address codes each of which specifies a corresponding one of said data areas and thereby represents the item in the specified data area, and if at least one of said items of said table once created by said data table creating and calculating means has been changed through said data input means, wherein said data creating and calculating means comprises means for determining whether any of said at least one mathematical expression included in said table of items once created by said data table creating and calculating means has been changed, and further comprises means for performing a re-calculating operation to solve each of said at least one mathematical expression that has been changed.

11. A text processing system according to claim 10, wherein said data input means comprises a re-calculating key for producing a re-calculation command, and said data table creating and calculating means further comprises means, responsive to said re-calculation command, for performing re-calculating operations to solve all of said at least one mathematical expression included in said table of items.

12. A text processing system according to claim 10, wherein said data input means comprises a re-calculating key for producing a re-calculation command, and said data table creating and calculating means further comprises means, responsive to said re-calculation command, for performing re-calculating operations to solve only such mathematical expression that is associated with said at least one item of the table table which has been changed.

13. A text processing system comprising:

data input means for entering data;

display means for displaying data entered through said data input means, said display having a display screen;

data table creating and calculating means, for creating table data representative of a table of items including numerical values and at least one mathematical expression which are entered through said data input means and displayed in respective data areas of said display screen, performing a calculating operation to solve each of said at least one mathematical expression, and displaying a result of said calculating operation together with said items, said table data including sets of item data representative of said numerical values and said result, respectively;

indicating means for providing an indication informing an operator of the system of a necessity of activating said data table creating and calculating means to effect re-calculation associated with at least one of said at least one mathematical expression, if said at least one mathematical expression includes at least one algebraic formula each including address codes each of which specifies a corresponding one of said data areas and thereby represents the item in the specified data area, and if at least one of said items of said table once created by said data table creating and calculating means has been changed through said data input means; and selecting means, operable upon activation of said indicating means, for selecting one of a first mode in which said data table creating and calculating means is activated to effect said re-calculation after said indicating means is activated, and a second mode in which said table creating and calculating means is not activated to effect said re-calculation after said indicating means is activated, and wherein said data input means comprises an operator-controlled means for controlling said selecting means to select one of said first and second modes.

14. A text processing system according to claim 13, wherein said data table creating and calculating means is automatically activated to effect said re-calculation to solve all of said at least one mathematical expression when said first mode is selected by said selecting means through said operator-controlled means.

* * * * *